June 13, 1950 V. P. LAW 2,511,642
RAKE
Filed Jan. 17, 1949
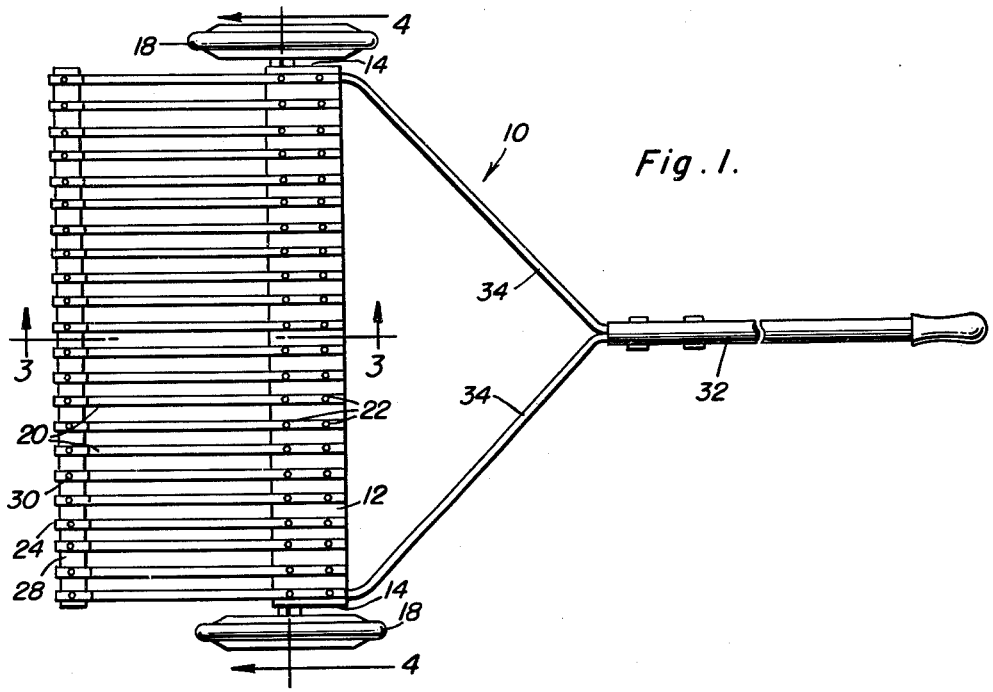
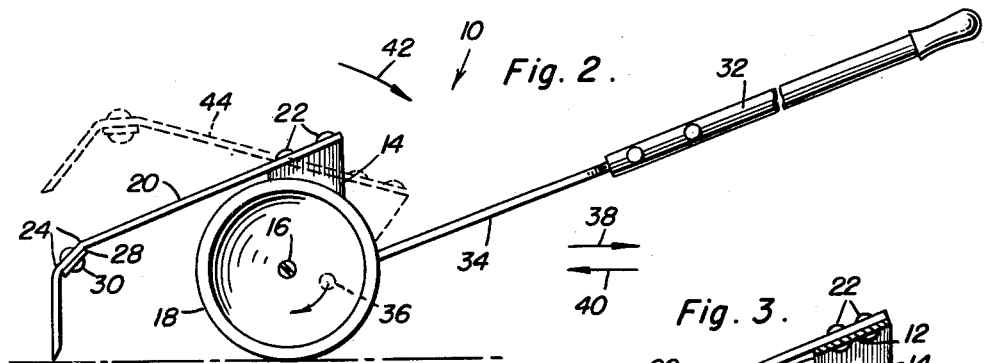
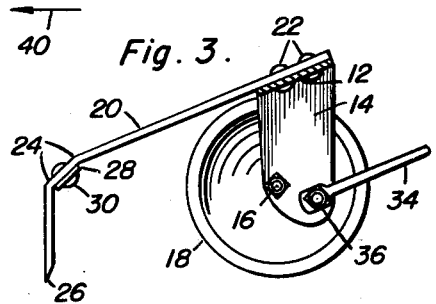
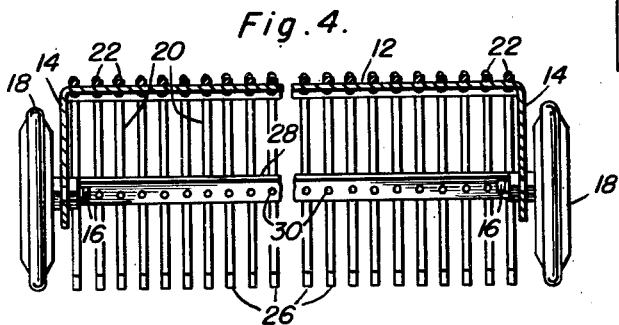
Vincent P. Law
INVENTOR.

UNITED STATES PATENT OFFICE 2,511,642

RAKE

Vincent P. Law, Kansas City, Mo.

Application January 17, 1949, Serial No. 71,364

1 Claim. (Cl. 56—400.14)

This invention relates to new and useful improvements and structural refinements in rakes, and the principal object of the invention is to provide a wheeled rake, such as may be conveniently and expeditiously drawn along the ground for the purpose of gathering leaves, or the like, and from which the accumulation of material may be quickly and easily released without the necessity of lifting the rake from the ground.

This object is achieved by the provision of the instant rake which embodies in its construction a wheeled frame carrying a set of ground-engaging tines and provided with an actuating handle, an important feature of the invention residing in the arrangement of the handle and frame in such manner that when the rake is drawn forwardly by means of the handle, the tines are urged in engagement with the ground, but when the rake is pushed rearwardly by the handle, the frame becomes tilted, so to speak, on the axis of the wheels, and the tines are automatically disengaged from the ground.

Some of the advantages of the invention reside in its simplicity of construction, in its convenient operation and in its adaptability to economical manufacture.

With the above more important objects and features in view and such other objects as may become apparent as this specification proceeds, the invention consists essentially in the arrangement and construction of parts as illustrated in the accompanying drawings, in which:

Figure 1 is a top plan view of the invention;

Figure 2 is a side elevational view thereof;

Figure 3 is a cross-sectional view, taken substantially in the plane of line 3—3 in Figure 1; and Figure 4 is a cross sectional view, taken substantially in the plane of line 4—4 in Figure 1.

Like characters of reference are employed to designate like parts in the specification and throughout the several views.

Referring now to the accompanying drawings in detail, the invention consists of a rake designated generally by the reference character 10, the same embodying in its construction a substantially horizontal frame member 12 provided at the ends thereof with a pair of downwardly extending side plates 14 which, in turn, are equipped with a pair of laterally projecting studs or stub-axles 16 which are axially aligned, as is best shown in Figure 4. A pair of travelling wheels 18 are rotatably mounted on the axles 16, whereby the entire rake may be easily propelled along the ground.

A set of spaced parallel tines 20 are secured by suitable screws or rivets 22 to the frame member 12, the tines being angulated intermediately of their length, as at 24, so that they extend rearwardly and downwardly and terminate in ground-engaging extremities or points 26. If desired, the tines 20 may be reinforced adjacent their points of angulation 24 by a cross member 28 to which the tines are secured by additional rivets 30.

An upwardly and forwardly extending handle 32 is provided at the lower, rear end thereof with a fork 34, the free end portions of which are pivotally attached by suitable bolts, screws or rivets 36 to the side plates 14, as is best shown in Figure 3. It is to be noted that the pivots 36 are disposed below and forwardly from the stub-axles 16, this arrangement being such that when the rake is drawn forwardly in the direction of the arrow 38 in Figure 2, the side plates 14 will function in the nature of a lever, forcing the extremities 26 of the tines 20 into the ground for the purpose of gathering leaves, or the like. However, when the handle 32 is pushed rearwardly in the direction of the arrow 40, the leverage afforded by the eccentric disposition of the pivots 36 with respect to the shafts 16 will cause the side plates 14 and the frame member 12 to tilt as indicated at 42, thus elevating the tines to a position shown by the phantom lines 44, so that the leaves, etc. accumulated on the tines may be instantly released.

It is believed that the advantages and use of the invention will be clearly apparent from the foregoing description and, accordingly, further disclosure thereof at this point is deemed unnecessary.

Having described the invention, what is claimed as new is:

In a rake, the combination of a substantially horizontal frame member provided at the ends thereof with a pair of downwardly extending side plates, a set of ground-engaging tines secured to said frame member and extending rearwardly and downwardly therefrom, a pair of axially aligned stub axles provided on said side plates, a pair of travelling wheels rotatably mounted on said stub axles, a forwardly and upwardly extending handle provided at its rear end with a fork, and a pair of pivots connecting end portions of said fork to said side plates at eccentrically disposed points relative to said stub axles, whereby said frame member and side plates may be tilted on said axles upon actuation of said handle to disengage said tines from the ground.

VINCENT P. LAW.

REFERENCES CITED

The following references are of record in the file of this patent:

UNITED STATES PATENTS

| Number | Name | Date |
|---|---|---|
| 957,900 | Platt | May 17, 1910 |